Patented Mar. 4, 1924.

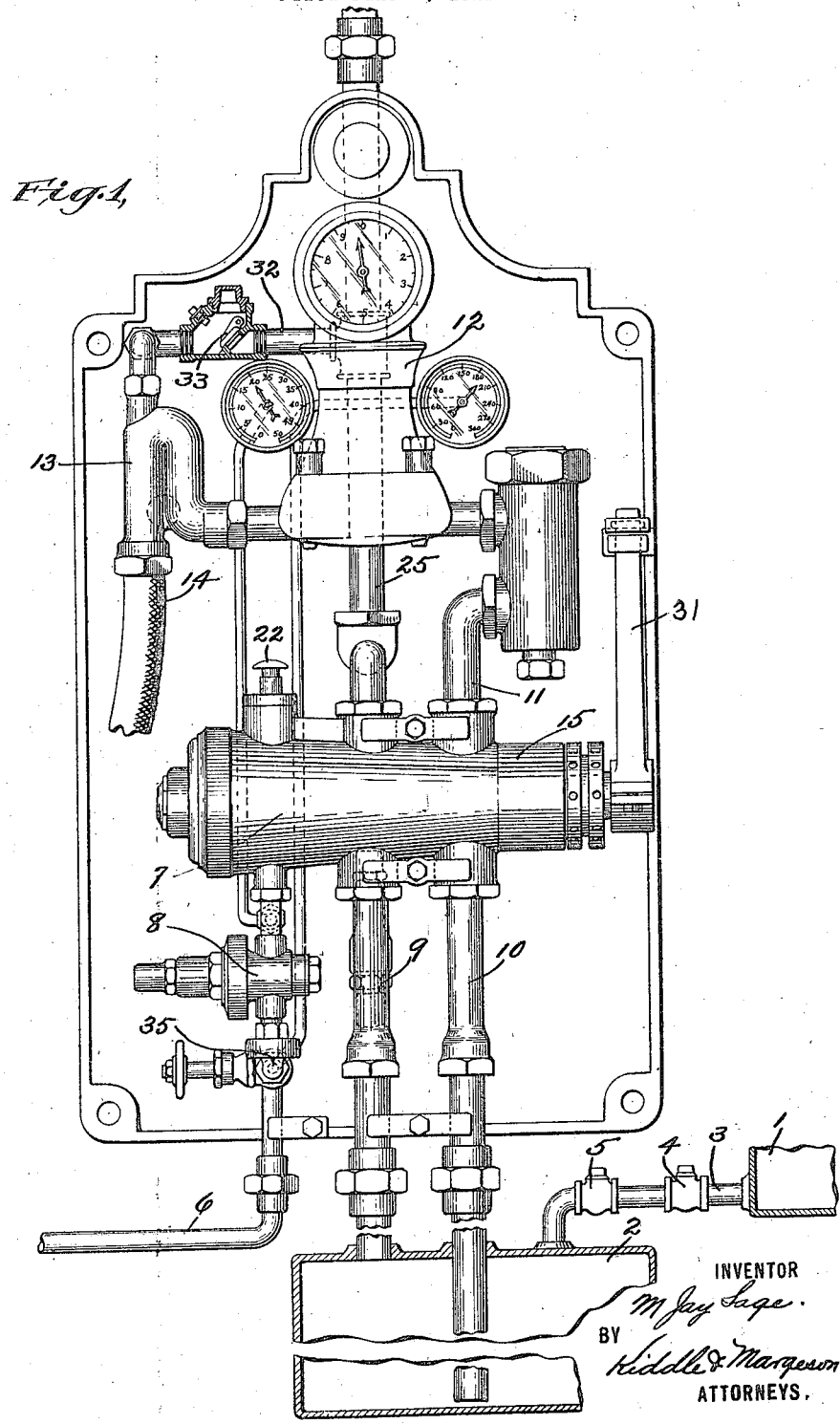

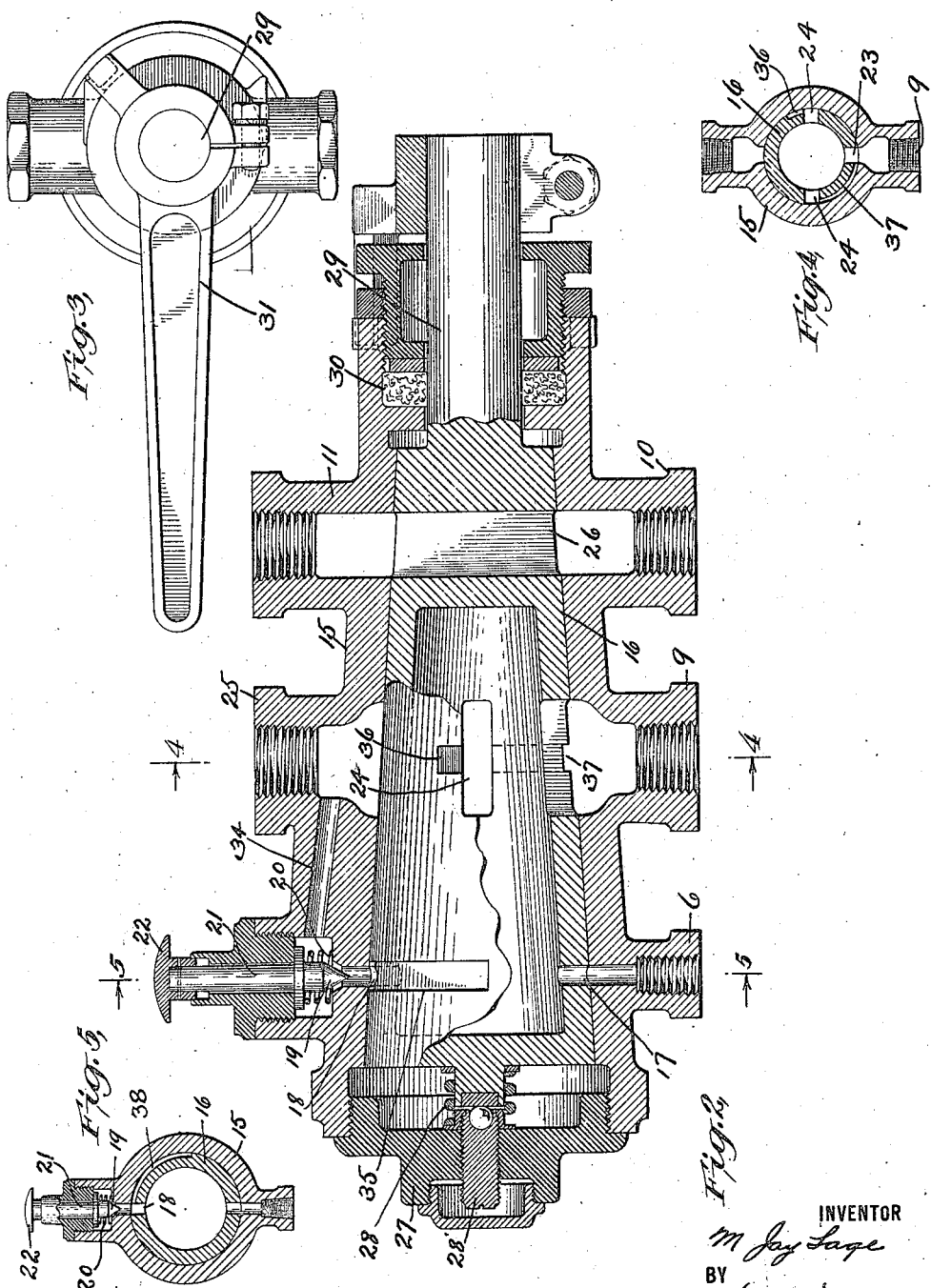

1,485,720

UNITED STATES PATENT OFFICE.

M JAY SAGE, OF BROOKLYN, NEW YORK, ASSIGNOR, BY MESNE ASSIGNMENTS, TO SAGE AIR SYSTEMS, INC., A CORPORATION OF NEW YORK.

APPARATUS FOR DISPENSING LIQUIDS.

Application filed June 7, 1921. Serial No. 475,574.

*To all whom it may concern:*

Be it known that I, M JAY SAGE, a citizen of the United States, and a resident of the borough of Brooklyn, in the city of New York, county of Kings, and State of New York, have invented certain new and useful Improvements in Apparatus for Dispensing Liquids, of which the following is a specification.

My invention relates to an apparatus for dispensing liquids and is particularly directed to an apparatus for dispensing liquids of a hazardous nature such as gasoline for example, wherein it becomes necessary to provide means whereby danger from fire or the like is eliminated and wherein, should the attendant leave the apparatus for any reason, the discharge of liquid therefrom will immediately be shut off.

In general, my device comprises an apparatus wherein the liquid is dispensed by air pressure upon the same, the application of the air to the liquid and the consequent discharge of the liquid being controlled by a single valve, means having been provided also whereby the pressure of air upon the liquid will be automatically relieved and the discharge of liquid from the apparatus stopped, should the apparatus be left unattended for any reason whatsoever.

In the accompanying drawings wherein I have illustrated an embodiment of my invention,—

Fig. 1 shows my improved apparatus in elevation;

Fig. 2 shows the valve mechanism employed;

Fig. 3 is a view of the controlling lever for controlling a portion of the valve mechanism of Fig. 2;

Fig. 4 is a section on the line 4—4 of Fig. 2; and

Fig. 5 is a section on the line 5—5 of Fig. 2.

Referring to the drawings in detail,—1 designates a main tank adapted to contain gasoline or other liquid which it is desired to dispense and 2 an auxiliary tank communicating with the main tank by a pipe 3 whereby liquid will flow from one tank to the other by gravity, this flow of liquid being controlled by suitable valves 4 and 5. 6 designates a pipe adapted to be connected to any suitable source of air under pressure, this pipe communicating with valve mechanism designated 7 as a whole, the valve mechanism being shown in detail in Fig. 2 and being described in detail hereinafter. The supply of air from the pipe 6 to the valve mechanism 7 is suitably controlled by valve mechanism 8 whereby the pressure upon the liquid being dispensed may be regulated.

The auxiliary tank 2 is connected by a pipe 9 to the valve mechanism 7 so that air under pressure may flow through the pipe 6, valve mechanism 7 and pipe 9 to the liquid in the tank 2. The tank 2 is connected to the valve mechanism 7 also by a pipe 10 which for convenience I will term a liquid supply pipe. The valve mechanism 7 is connected to a pipe 11 whereby liquid may flow from the tank 2 through the supply pipe 10, valve 7 and pipe 11 to a meter 12, the latter being suitably connected to a discharge pipe 13 provided with a hose connection 14.

From the description thus far given it will be seen that air under pressure may pass through the pipe 6, the valve mechanism 7 and pipe 9 to the liquid in the auxiliary tank 2 to force the same upwardly through the pipe 10 and out of the discharge pipe 13.

The valve mechanism is illustrated in detail in Fig. 2 and comprises a fixed casing 15 within which is located a rotary sleeve valve 16. This valve 16 is provided with an air inlet port 17 adapted to be placed in communication with the air inlet pipe 6 when the valve is properly manipulated. The valve is also provided with a port 18 controlled by a valve 19 which valve is unseated automatically by a spring 20. This valve 19 I shall term for convenience a relief valve. The valve stem 21 of the relief valve projects beyond the top of the valve mounting and is adapted to be actuated downwardly against the action of the spring 20 to close the valve by means of a cap 22.

The valve 16 is provided with a port 23 and ports 24, the port 23 being adapted to be moved into position to place the interior of the valve 16 in communication with the pipe 9 when it is desired to dispense liquid from the tank 2 and the ports 24 being adapted to be moved into position to place the pipe 9 in communication with an air exhaust pipe 25 when liquid is not being dispensed, the port 23 at that time being moved to a position whereby its communication with the pipe 9 is cut off. The valve 16 is also provided with a port 26 which is adapted to place the supply pipe 10 and the pipe 11 in communication with each other whereby liquid may be discharged from the tank 2 upwardly through the pipe 10, port 26 of the valve 16 and pipe 11 to the meter 12. Attached to the casing 15 is a valve chamber cap 27 provided with a valve retaining spring 28 engaging the sleeve 16 and a threaded plug 28'. By this arrangement the resistance of the valve 16 can be adjusted as desired.

The valve 16 is provided with a stem 29 extending through the casing 15, properly packed at 30. This stem 29 carries an operating handle 31 by which the valve may be rotated in the operation of the device.

The air exhaust pipe 25 heretofore referred to, is connected by a short section of pipe 32 to the outlet pipe 13 and in this line I provide a check valve 33, this valve being so disposed that air from the exhaust line 25 may pass through the pipe 32, past the valve 33 and out of the discharge pipe 13 for a purpose to be hereinafter referred to.

The operation of my device will now be described:

Assuming that it be desired to dispense liquid from the tank 2, the cap 22 is pushed downwardly to close the valve 19 and the lever 31 at the same time actuated to rotate the valve or sleeve 16 to the position shown in Fig. 2. With the parts in this position, air from a source of supply is free to pass through the pipe 6 and air inlet port 17 to the interior of the sleeve or valve 16. Inasmuch as the ports 24 are at this time out of communication or register with the pipe 9 and the exhaust pipe 25, and inasmuch as the valve 19 is at this time held closed, the air admitted to the interior of the sleeve 16 is compelled to pass by way of the port 23 through the pipe 9 to the liquid in the tank 2. This will cause the liquid in the tank 2 to pass upwardly through the supply pipe 10, port 26 of the valve 16 and by way of the pipe 11 to the meter 12, the liquid passing through the meter and out of the discharge pipe 13. This flow of liquid will continue as long as the parts remain in this position but if for any reason the attendant should leave the apparatus the spring 20 will automatically open the valve 19 which will relieve the pressure of air upon the liquid in the tank 2, the air escaping from the interior of the valve 16 by way of port 18 to the exhaust pipe 25 by way of a passage 34. When the parts are again restored to normal or inoperative position, the valve 19 will be raised and the ports 24 will have been moved to place the pipe 9 in communication with the exhaust port 25' and exhaust pipe 25. Likewise the port 26 will have been moved to no longer establish communication between the pipes 10 and 11 and the air inlet port 17 will no longer register with the air supply pipe 6.

As the exhaust air from the interior of the valve 16 passes outwardly through the exhaust pipe 25 some of it will flow through the pipe 32 past the check valve 33 and downwardly to the discharge pipe 13, thereby thoroughly draining the same. The supply of air to the interior of the valve 16 may then be shut off by a control valve 35.

The valve sleeve 16 has also been provided with by-pass ports 36, 37, and 38 to further ensure that the pressure in the system will be relieved when the parts are moved to normal or non-dispensing position, the port 38 communicating with the interior of the valve sleeve 16 by way of port 18 already referred to, and the ports 36 and 37 by way of ports 24.

As soon as the pressure on the liquid in the tank 2 has been relieved due to the escape of air from the system by way of pipe 9 and exhaust pipe 25, the tank will be automatically refilled from the main tank 1 so that the tank 2 will always contain a supply of liquid being dispensed.

It will be seen from the foregoing that I have provided an apparatus whereby liquid may be dispensed by air pressure and wherein accidental discharge of liquid from the apparatus is prevented.

It will be seen also that I have provided in effect a three-way valve, one port admitting pressure to the liquid being dispensed during the dispensing operation and the other two ports establishing communication between the tank containing the liquid and an exhaust pipe when the liquid is not being dispensed to relieve pressure upon the liquid in the auxiliary tank 2 so that the same can be automatically refilled from the main tank 1.

It will be seen also that I have provided a relief valve which automatically moves to open position in the event of an attendant leaving the apparatus so that the pressure in the system is automatically relieved and the dispensing of the liquid stopped. This latter feature is of great importance inasmuch as it prevents an abnormal discharge of liquid from the tank 2.

While I have illustrated and described a specific embodiment of my invention it is to be understood that changes may be made in the details thereof within the purview of the invention.

What I claim is:

1. In combination, a valve casing having air inlet and outlet ports, an exhaust port and a rotary valve within said casing having ports adapted to establish communication between said inlet port and outlet port at one setting of the valve and means for placing said inlet port, outlet port and exhaust port in communication at the same setting of the rotary valve.

2. In combination, a valve casing, a rotary valve therein, an air inlet port, an air outlet port and an exhaust port in said casing, a relief port in said casing communicating with said outlet port, said valve when operated to one position establishing communication between said inlet port and outlet port and means for establishing communication between said relief port and said exhaust port while the valve is in position to establish communication between the inlet port and the outlet port.

3. In combination, a valve casing having an air inlet port, an air outlet port, an exhaust port and a liquid discharge port, a hollow valve within said casing, means for rotating said valve, a relief port in said casing, ports in said valve for establishing communication through the interior of said valve between said air inlet port and outlet port when the valve is rotated to one position and to open said liquid discharge port at the same time, ports in said valve for establishing communication through the interior of said valve between said air outlet port and said exhaust port when the valve is rotated to another position, the air inlet port at the same time being closed off, and means for establishing communication between the interior of said valve and said exhaust port by way of said relief port if desired when the air inlet port and the air outlet port are in communication with each other.

This specification signed this 4" day of June, 1921.

M. JAY SAGE.